US006176661B1

(12) United States Patent
Grant

(10) Patent No.: US 6,176,661 B1
(45) Date of Patent: Jan. 23, 2001

(54) STERN DRIVE AND OUTBOARD LOCKS

(76) Inventor: Christopher J. Grant, 2120 Lawson Ave., Port Charlotte, FL (US) 33952

( * ) Notice: Under 35 U.S.C. 154(b), the term of this patent shall be extended for 0 days.

(21) Appl. No.: 09/496,419

(22) Filed: Feb. 2, 2000

Related U.S. Application Data

(60) Provisional application No. 60/155,576, filed on Sep. 24, 1999.

(51) Int. Cl.[7] .............................. F16B 39/02; F16B 39/04

(52) U.S. Cl. ................................ 411/87; 411/99; 411/910; 70/230

(58) Field of Search .................................. 411/87, 99, 90, 411/966, 910; 70/229, 230

(56) References Cited

U.S. PATENT DOCUMENTS 3,752,254 * 8/1973 Carley et al. ...................... 70/230 X
4,030,324 * 6/1977 Rizio .................................. 70/230 X
4,466,261 * 8/1984 Zimmer .............................. 70/230 X
4,562,707 * 1/1986 Graham, III ....................... 411/87 X
4,655,060 * 4/1987 Jakugas ................................. 70/230

* cited by examiner

*Primary Examiner*—Neill Wilson
(74) *Attorney, Agent, or Firm*—Frank A. Lukasik

(57) ABSTRACT

The invention is a locking device for securing outboard motors and stern drives against theft. The invention attaches to the normal mounting bolts of a stern drive or outboard motor. The lock of the invention consists of two, one inch diameter, 304 work-hardened stainless steel lock nuts, one with a through hole and the other with a blind hole. A work hardened stainless steel pin and a work hardened stainless steel sleeve and two tempered steel roll pins make up the lock.

2 Claims, 9 Drawing Sheets

STERN DRIVE AND OUTBOARD LOCKS

RELATED APPLICATION

This application is a Continuation-In-Part of Provisional Application Ser. No. 60/155,576, Filed Sep. 24, 1999.

BACKGROUND OF THE INVENTION

1. Field of the Invention

This invention relates generally to locking devices and more particularly to a locking device for securing outboard motors and stern drives against theft.

2. Description of the Prior Art

The marine industry is experiencing an escalation in the number of thefts of stern drives and outboard motors from boats stored in marinas or private docks or whatever a thief may have occasion to work undetected for a brief period. As motors and stern drives become more sophisticated and thus more expensive, the market for stolen units is increasing. It takes only minutes for a thief using battery powered tools, to release a motor or stern drive and remove it. Besides the inconvenience of replacing the stolen motor, filing an insurance claim is time consuming and increases the cost of premiums.

Locking means for outboard motors and stern drives that are commonly available, are only a minor deterrent to theft. Thieves can defeat such systems in a variety of ways, mostly by either gripping the lock with special tools to unthread the lock or by simply cutting a face into its surface making it accessible to normal wrenches. Most locking devices now available, rely upon special keys or tools for installation and removal, and while such tools are meant only for legitimate access, thieves can simply obtain sets of the tools or keys for their own use.

Thus, an object of the invention is to provide the boat owner with a means of securing an outboard motor or stern drive using a unique combination of simple components which, when used together, provide a secure and tamper-proof attachment means.

This object, as well as other aspects, objects and advantages of the present invention will become apparent to those skilled in the art after reading the following description of the preferred embodiments in conjunction with the accompanying drawings, and the appended claims.

SUMMARY OF THE INVENTION

The essence of the instant invention is the use of very tough (304 stainless) components which attach to the normal mounting bolts of a stern drive or outboard and are locked together to form a secure, difficult to remove, attachment unit. Removal of the attachment unit is only necessary when a motor is changed, or in the case of a stern drive, whenever work has to be done on the drive shaft or upper gear system, all other service can be accomplished with either unit in situ.

The lock of the invention consists of two, one inch diameter, 304 work-hardened stainless steel lock nuts, one with a through hole and the other with a blind hole. A work hardened stainless steel pin and a work-hardened stainless steel sleeve and two tempered steel roll pins make up the lock. The instant invention can be installed using simply a socket or wrench and a small hammer to tap locking pins in place. Any moderately skilled boat owner can easily install the lock.

The instant invention, once assembled on the mounting studs of the stern drive or outboard motor, can only be removed by destroying the lock with appropriate shop tools, such as for example, a diamond edged saw. By reason of its construction from 304 work-hardened stainless, and the fact that over 1.25 inches of the steel must be cut to effect its removal and that the removal must be done in a special sequence of cuts, the time thus involved is sufficient to deter a thief from taking the motor or stern drive.

DESCRIPTION OF THE PREFERRED EMBODIMENT

Figure 1:
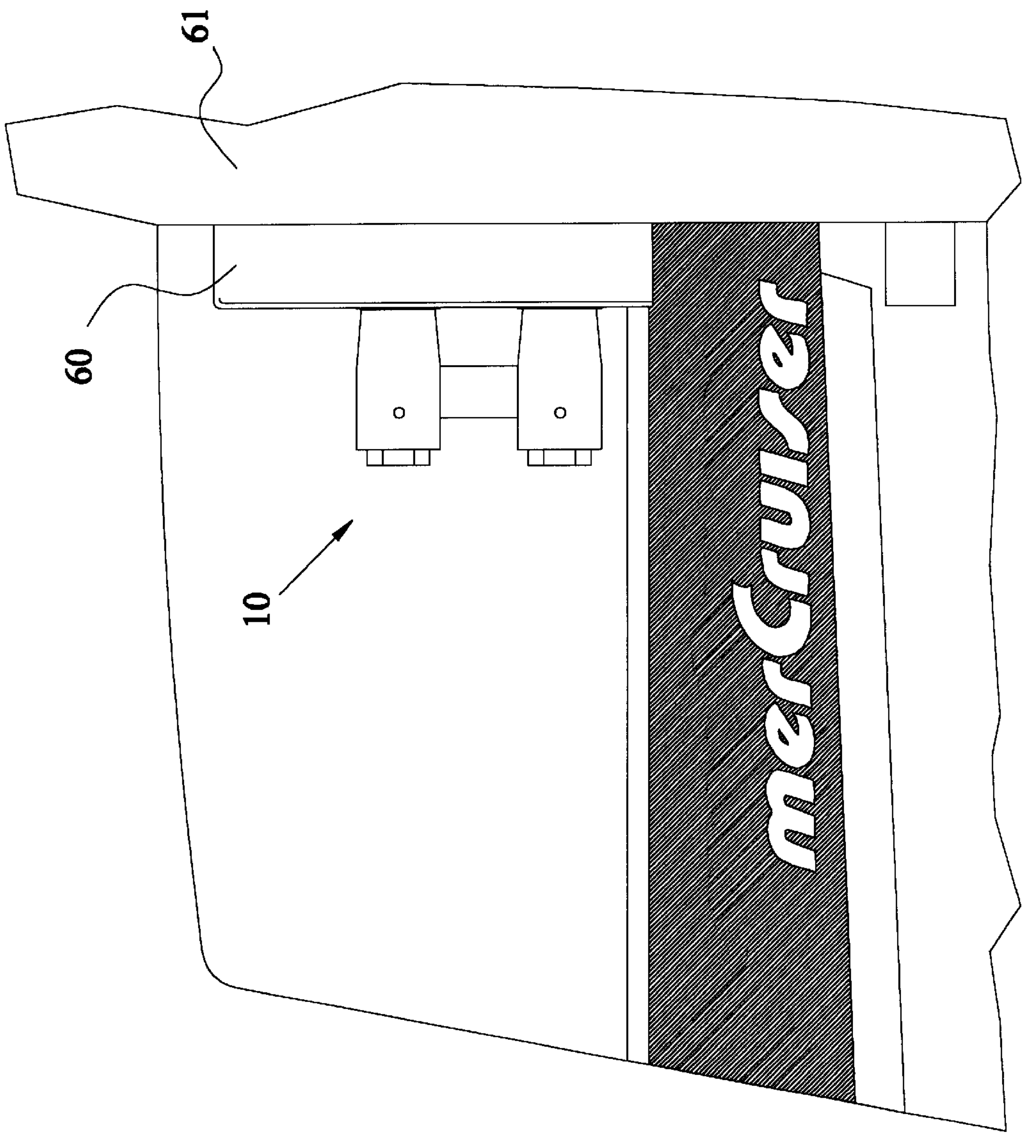
FIG. 1 is a side view of a typical outdrive unit with the invention shown installed in accordance with the invention.

Referring now to the drawings, wherein like numerals designate like and corresponding parts throughout the several views, numeral 10 generally designates the locking device assembly of the invention. In FIG. 1, the overall locking device assembly is fitted to out drive 60 and motor body 61.

Figure 2:
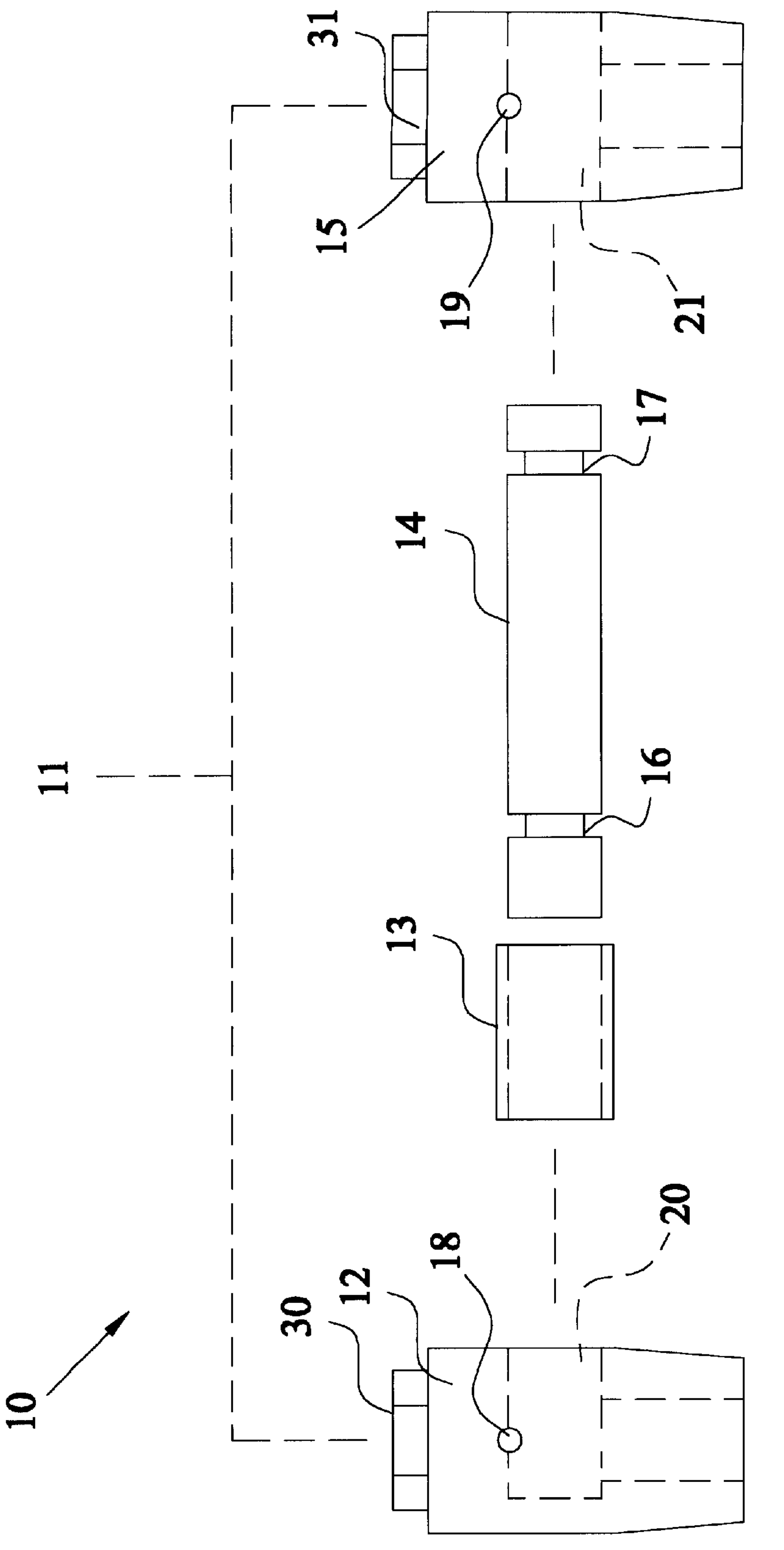
FIG. 2 is an exploded view of the locking device showing the component parts in accordance with the invention.

In FIG. 2, the component parts of the locking assembly are shown in an exploded view with the entire assembly designated by numeral 11. The lock 10 consists of two, one inch diameter, 304 work-hardened stainless steel lock nuts 12 and 15 with through hole 21 (lock 15) drilled at 90° to a center line drawn through the lock nut 15, and blind hole 20 (lock 12) drilled at 90° to a center line drawn through the lock 12, ¾ inch hex heads 30 and 31, a ½ inch diameter, 304 work-hardened stainless steel pin 14, a ⅝ inch diameter 304 work-hardened stainless steel sleeve 13 and two tempered steel roll pins 40 and 40' (FIG. 3).

FIG. 2 shows detailed drawings of pin 14 having two ⅛ inch wide grooves 16 and 17 formed near each end. Sleeve 13 has an outside diameter of ⅝ inches and an inside diameter of ½ inch.

Figure 4:
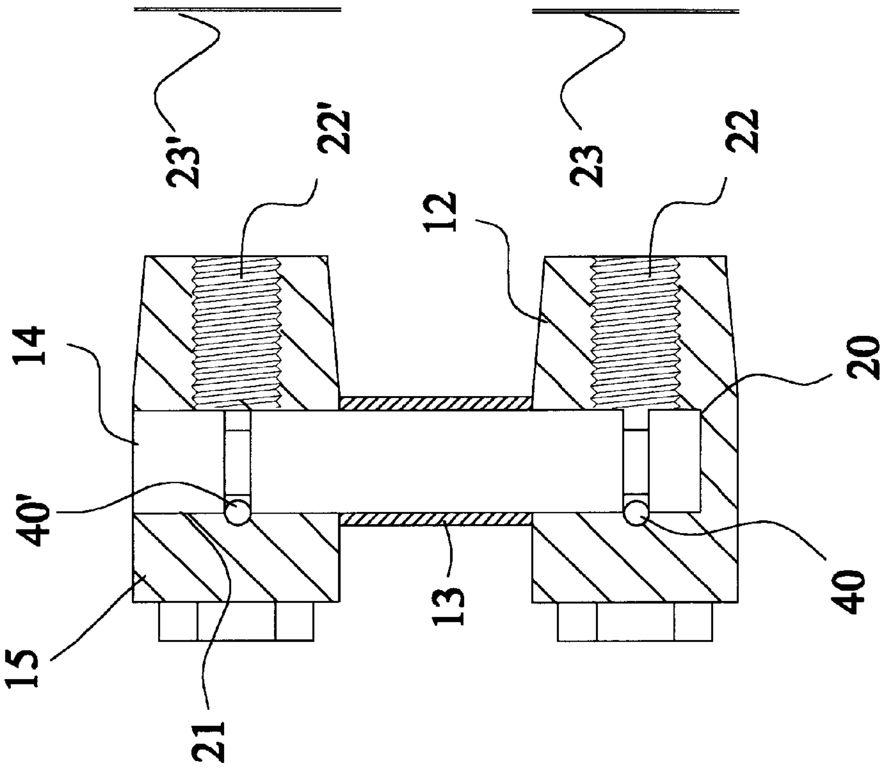
FIG. 4 is a side view, partially in section, showing the internal feat yes of the assembled device.
Figure 3:
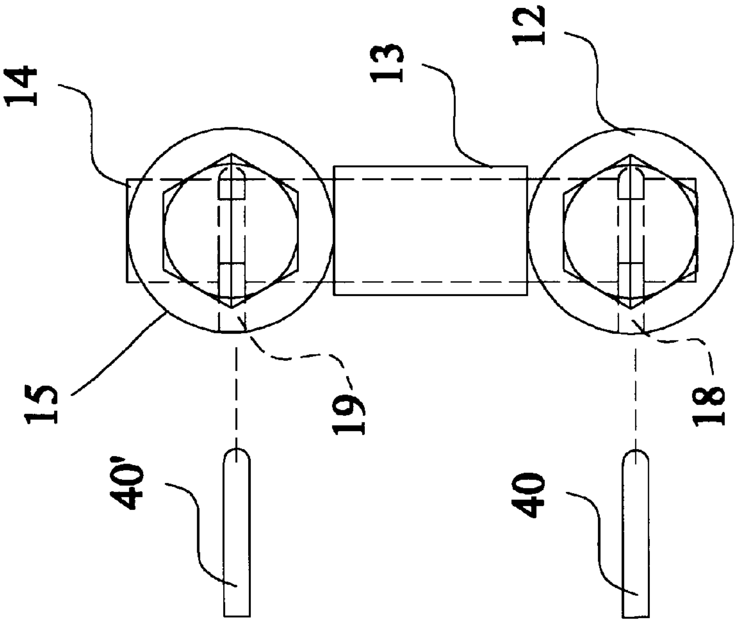
FIG. 3 a top view of the assembled device showing the locking pins.

FIG. 3 is a top view, partially in section, of the assembled lock 10 showing steel pins 40 and 40' prior to their installation through blind hole 18 drilled in lock 12, at 90° to the center line and intersecting blind hole 20 with one half of the hole 18 passing through hole 20, and blind hole 19 drilled in lock 15, at 90° to the center line and intersecting through hole 21 drilled in lock 15 (FIG. 2). FIG. 4 is a side view, partially in section, of the assembled lock showing 7/16 inch threaded holes 22 and 22' which are screwed onto exposed studs 51 and 52. Pin 14 is held in position within holes 20 and 21 and is secured by lock pins 40 and 40' which engage grooves 16 and 17.

Figure 5:
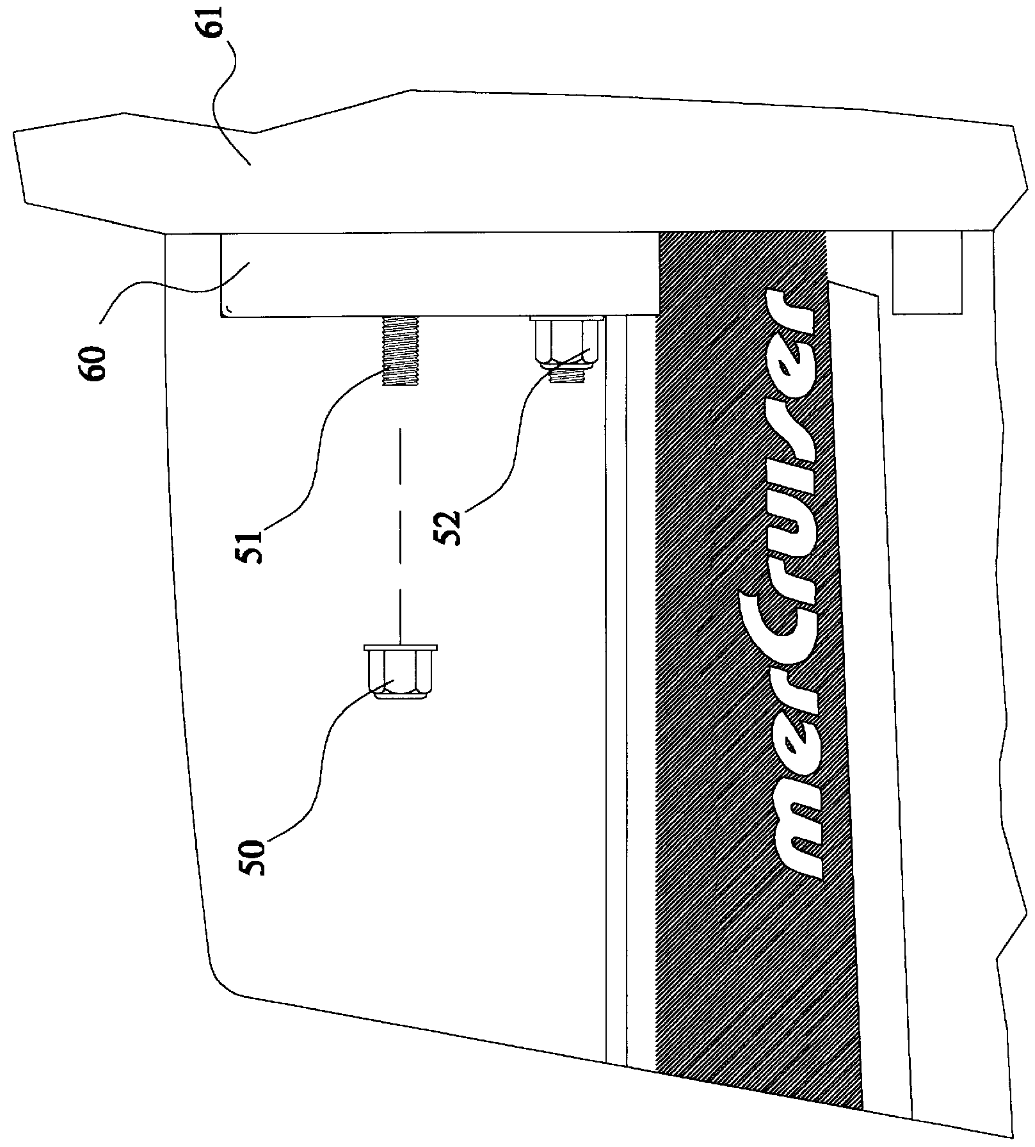
FIGS. 5–10 are a series of side views of a typical outdrive showing in sequence, the steps of the assembly procedure of the instant invention.

FIG. 5 is the first of the series of illustrations of the assembly sequence of the lock, wherein lock nuts 50 and 52 are removed. Stud 51 is now exposed ready for the mounting of the locking assembly 10.

Figure 6:
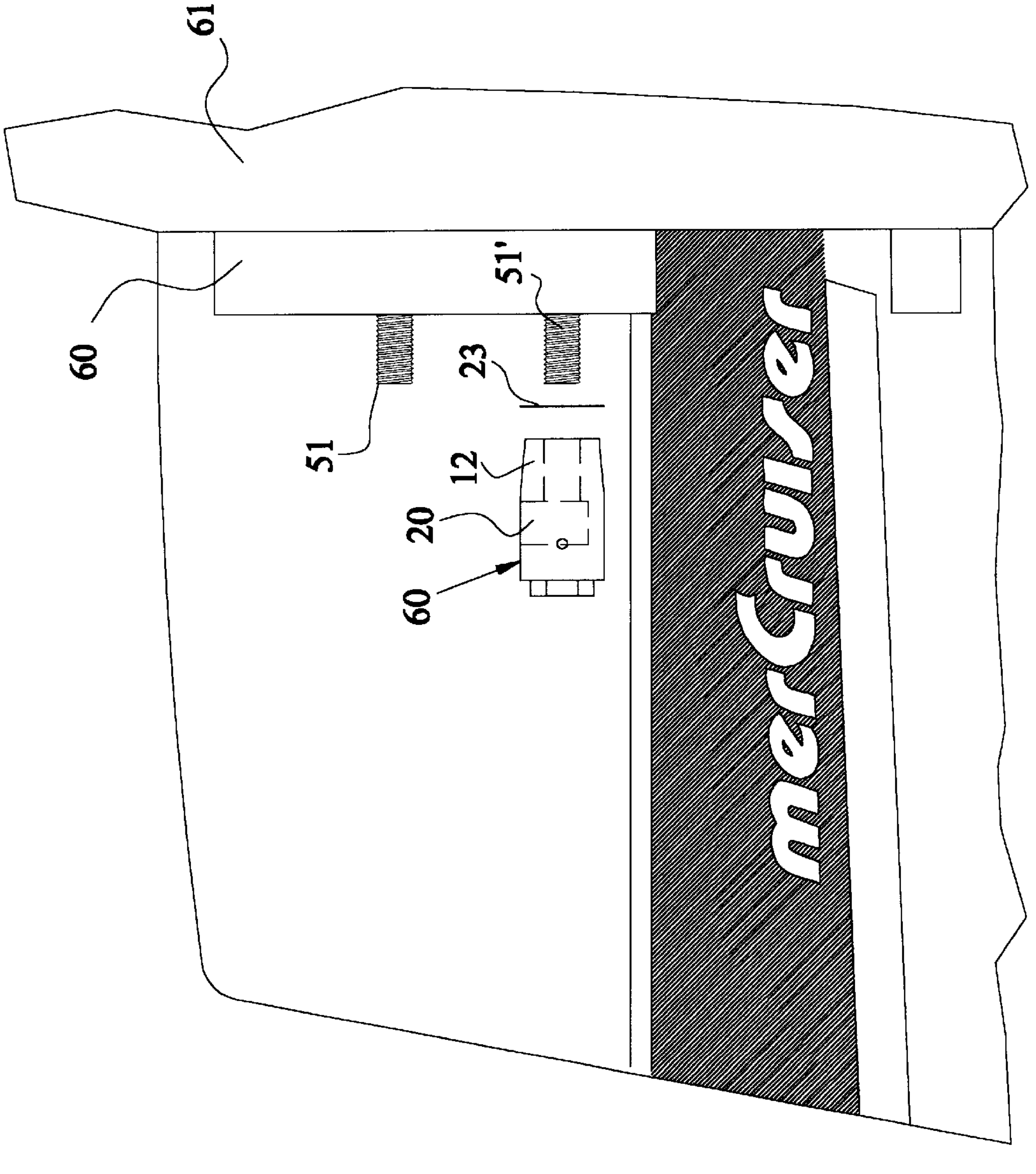
Figure 7:
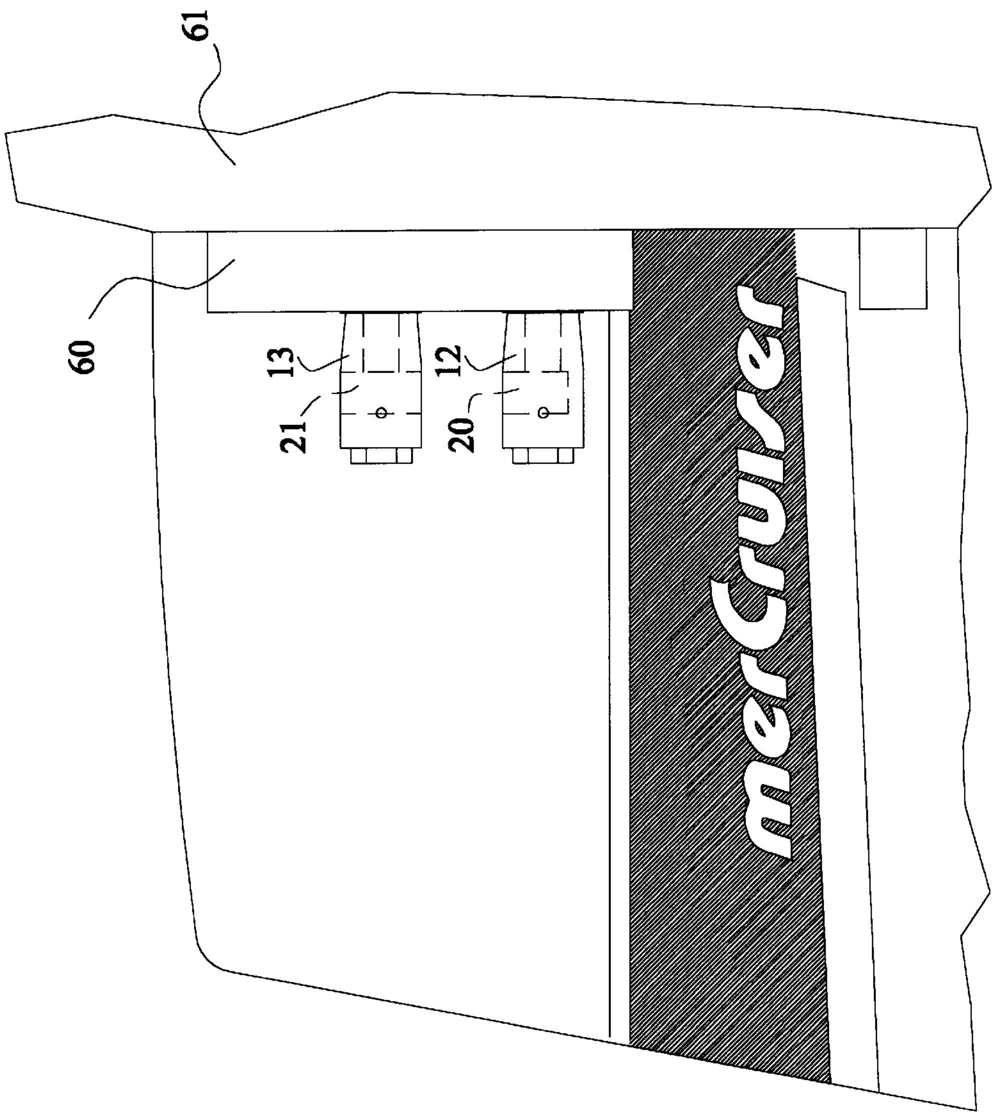

FIG. 6 shows the exposed stud 51 and 51' and nut 60 being offered up for threading onto the stud 51'. Spacer/shim 23 is interposed between the face of nut 12 and the face of out drive 60 the shim 23 allows nut 60 to be tightened while keeping the hole 20 in the correct vertical plane for the later installation of pin 14. Blue dot 60 on the dorsal surface of nut 12 is used as a reference point to show the user which way the nut 12 should be positioned. In FIG. 7, both locks 12 and 15 are in position with their holes, 20 and 21 respectively, lined up ready to receive sleeve 13.

Figure 8:
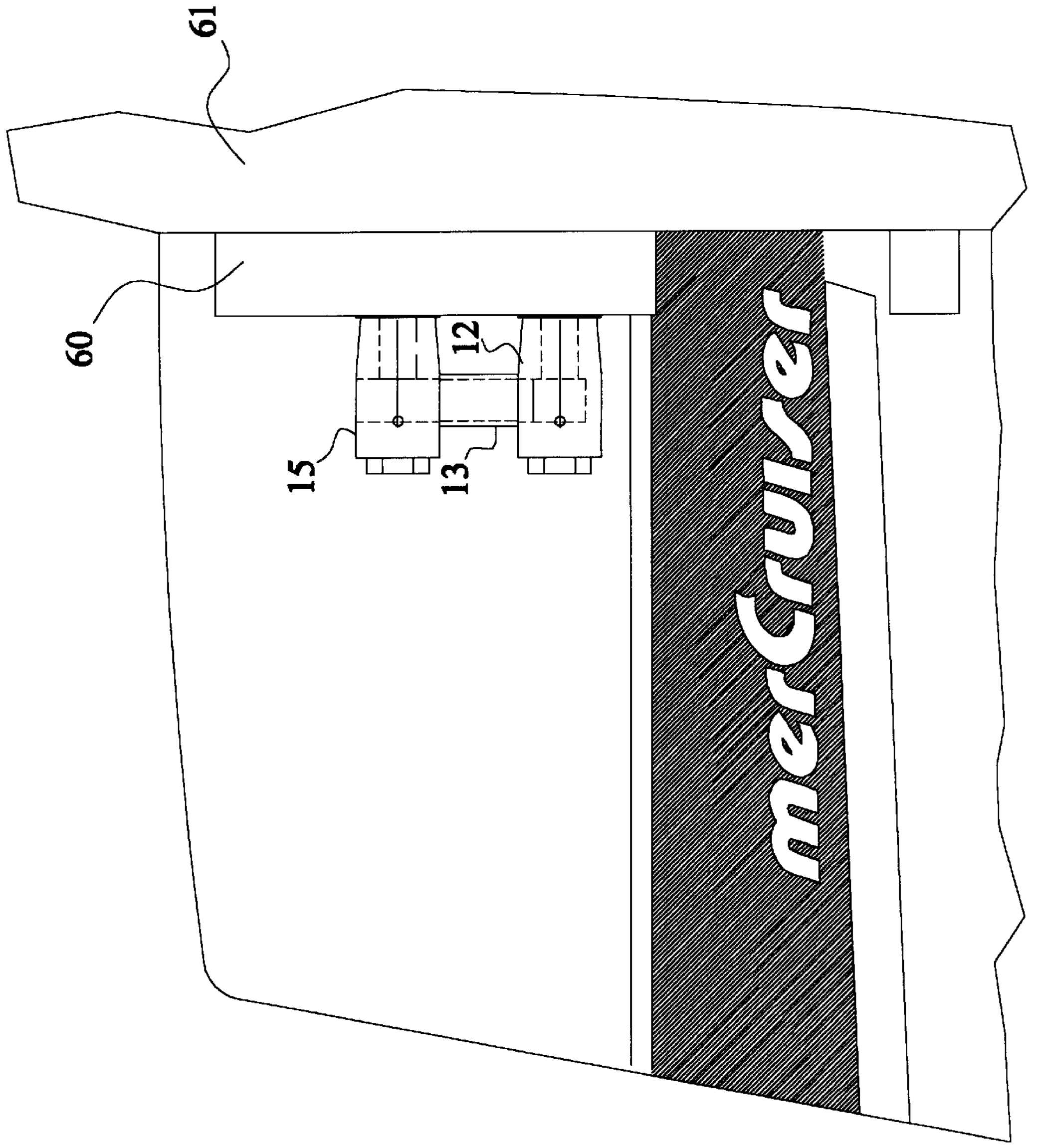

FIG. 8 shows sleeve 13 in position ready for pin 14 positioned for fitment and locking pins 40' and 40 are ready to be inserted as a final step.

Figure 9:
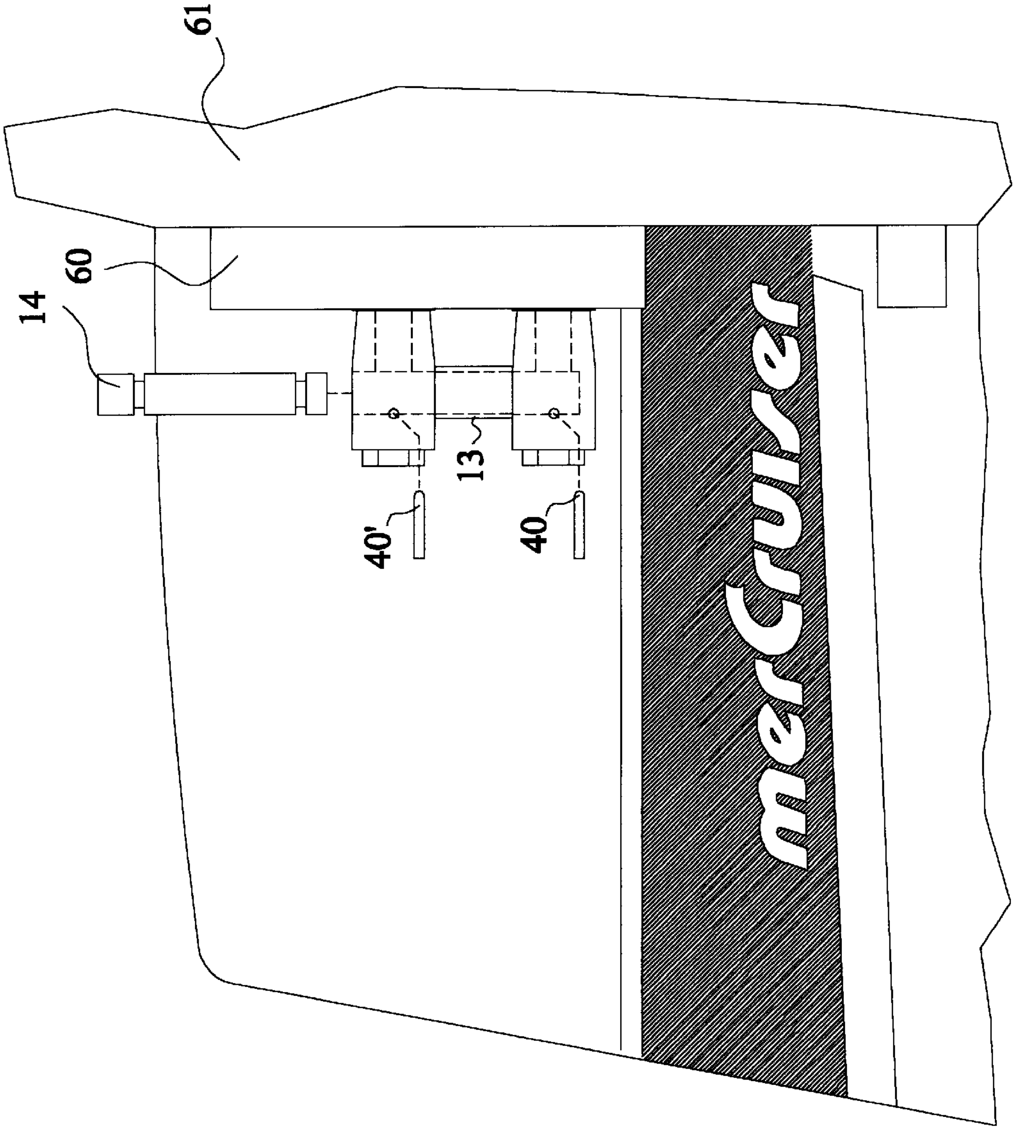

FIG. 9 shows pin 14 positioned for fitment and locking pins 40' and 40 ready to be inserted as a final step.

Figure 10:
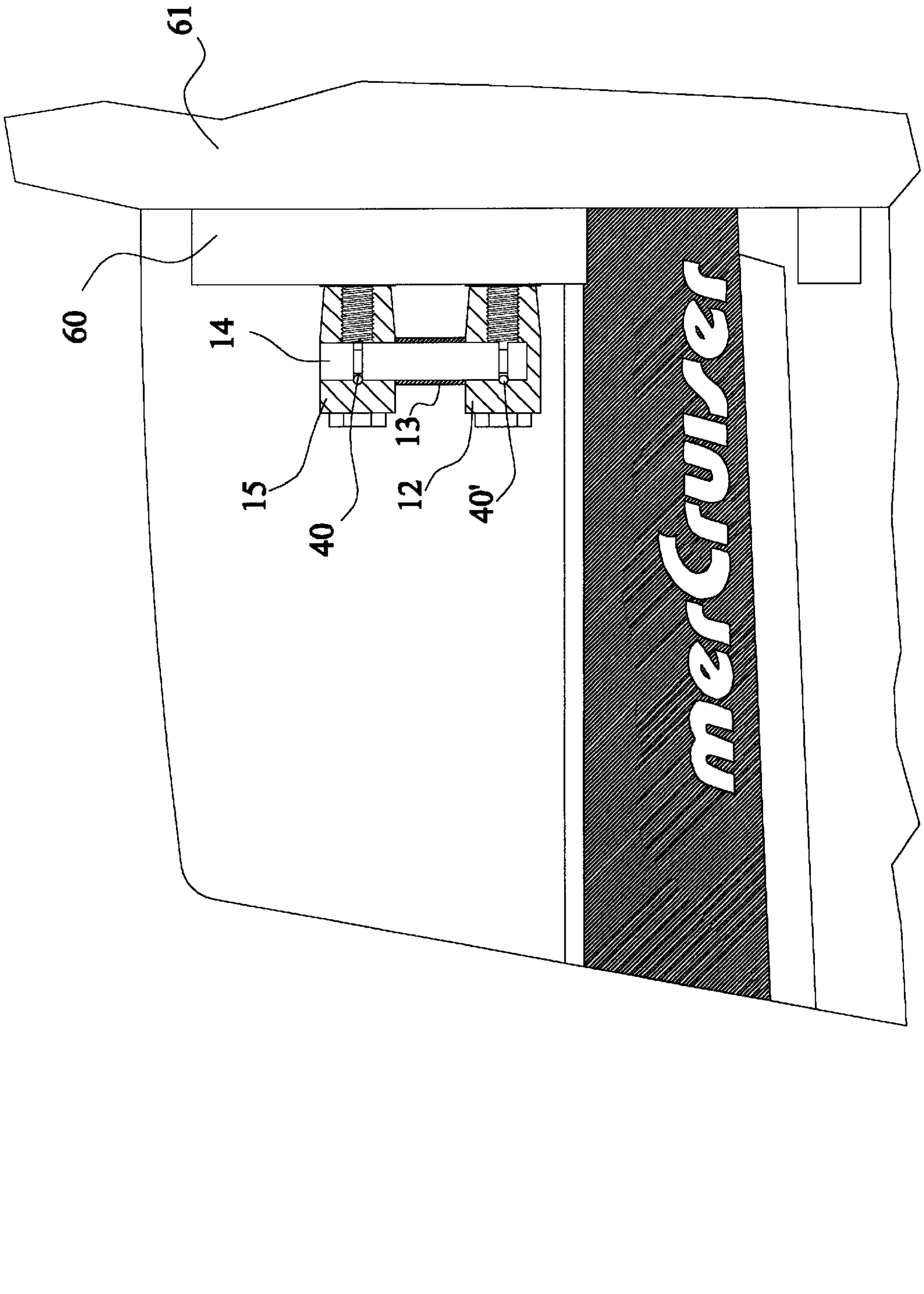

FIG. 10 is a view partially in section showing the lock assembly in position. From this view it is possible to visualize the difficulty that would be encountered in removing the assembly, nuts 12 and 15 cannot be unthreaded because pin 14 prevents their rotation. Locking pins 40 and 40' prevent the removal of pin 14. Sleeve 13 is rotatably attached to pin 14 and any effort to cut it is thwarted by its tendency to spin on pin 14. Similarly, pin 14 cannot be cut or drilled easily because it too can spin away from a cutting device. In actual removal, sleeve 13 is clamped and slit down its length using a 2 inch diameter diamond wheel. A larger wheel cannot get in to reach the sleeve 13 because it hits on nuts 12 or 15. The sleeve 13 is then rotated 180 degrees and clamped again and slit lengthwise to remove it from pin 14. Pin 14 is then clamped and cut close to nut 12, clamped again and cut close to nut 15. Nuts 12 and 15 can now be unthreaded.

While the above description constitutes preferred embodiments of the present invention, it will be appreciated that the invention is susceptible to modifications, variation and change without departing from the proper scope and fair meaning of the accompanying claims.

What is claimed is:

1. A locking device for securing outboard motors and stern drives mounted on a plurality of exposed studs on the stern of a boat, said device comprising:

a first stainless steel lock nut, said first lock nut having a first blind hole formed at 90° to a center line drawn through said first lock nut and a second blind hole formed at 90° to, and intersecting, said first blind hole at 90° and intersecting said first blind hole with one half of said second blind hole passing through said first blind hole, said first lock nut being screwed onto a first of said studs, said first blind hole being aligned in a vertical plane with a second exposed stud, a second stainless steel lock nut, said second lock nut having a through hole formed at 90° to a center line drawn through said second lock nut and a blind hole formed at 90° to, and intersecting said through hole at 90° and intersecting said through hole with one half of said blind hole passing through said through hole, said second lock nut being screwed onto said second of said studs, said through hole being aligned in a vertical plane with said first of said studs, a pin having a first and second end being installed through said through hole formed in said second lock nut, a first groove being formed near said first end and a second grove being formed near said second end, a sleeve being installed on said first end of said pin between said first and second lock nuts, said first end of said pin being installed in said first blind hole of said first lock nut, and a first locking pin being inserted within said second blind hole of said first lock nut, said first locking pin engaging said second groove formed in said second end, and a second locking pin being inserted within said second blind hole of said second lock nut, said second locking pin engaging said first groove formed in said first end of said pin.

2. A locking device for securing outboards and stern drives of claim 1 wherein spacer shims are interposed between the stern of the boat and each of the first and second lock nuts thereby providing alignment of said first blind hole of said first lock nut and said through hole of said second lock nut.

* * * * *